US008612531B2

(12) United States Patent
Guo et al.

(10) Patent No.: US 8,612,531 B2
(45) Date of Patent: Dec. 17, 2013

(54) MESSAGE CONVERSION APPARATUS, MESSAGE TRANSMISSION SYSTEM, MESSAGE TRANSMISSION METHOD AND COMPUTER PROGRAM PRODUCT THEREOF

(75) Inventors: Jun-Nan Guo, Kaohsiung (TW); Han Su, Taichung (TW)

(73) Assignee: Institute for Information Industry, Taipei (TW)

( * ) Notice: Subject to any disclaimer, the term of this patent is extended or adjusted under 35 U.S.C. 154(b) by 161 days.

(21) Appl. No.: 13/343,517

(22) Filed: Jan. 4, 2012

(65) Prior Publication Data

US 2012/0317211 A1 Dec. 13, 2012

(30) Foreign Application Priority Data

Jun. 8, 2011 (TW) .............................. 00120013 A

(51) Int. Cl.
*G06F 15/16* (2006.01)

(52) U.S. Cl.
USPC ........... 709/206; 701/409; 701/414; 701/423; 701/446

(58) Field of Classification Search
USPC ........................................................ 709/206
See application file for complete search history.

(56) References Cited

U.S. PATENT DOCUMENTS

| 2010/0205271 A1* | 8/2010 | Callaghan ...................... 709/206 |
| 2012/0016942 A1* | 1/2012 | Cherian et al. ................ 709/206 |
| 2012/0036547 A1* | 2/2012 | Aoyanagi et al. ............. 725/116 |
| 2012/0071168 A1* | 3/2012 | Tomici et al. ................. 455/445 |

OTHER PUBLICATIONS

Vehicular ad hoc networking based on the incorporation of geographical information in the IPv6 header. Wim Vandengerghe Oct. 19, 2012.*
Unified distribution of Pseudonyms in Hybrid Ephemeral Vehicular Networks Joseph T. Benin Dec. 2012.*
Information Dissemination in Vehicular Ad Hoc Networks Andreas Xeros Nov. 2012.*
Development of Telematics Communication System with WAVE DSRC Kang-Chiao Lin Oct. 2009.*

* cited by examiner

*Primary Examiner* — Tauqir Hussain
(74) *Attorney, Agent, or Firm* — Skaar Ulbrich Macari, P.A.

(57) ABSTRACT

A message conversion apparatus, a message transmission system, a message transmission method and a computer program product thereof are provided. The message transmission system comprises a first message conversion apparatus and a second message conversion apparatus. The first message conversion apparatus is configured to receive a TCP/UDP packet, convert the TCP/UDP packet into a dedicated protocol packet according to a first conversion rule and transmit the dedicated protocol packet. The second message conversion apparatus communicates with the first message conversion apparatus. The second message conversion apparatus is configured to receive the dedicated protocol packet and convert the dedicated protocol packet into the TCP/UDP packet according to a second conversion rule.

16 Claims, 9 Drawing Sheets

| | |
|---|---|
| PSID | An ID code used to identify a service class |
| Destination address | An IP address used to determine a destination apparatus to which a received WSMP packet shall be transmitted |
| Destination port | A port No. used to determine a destination apparatus to which a received WSMP packet shall be transmitted |
| Source address | An IP address used to determine a source from which a TCP/UDP packet can be received |
| Source port | A port No. used to determine a source port from which a TCP/UDP packet can be received |
| Receiving port | A port No. used to determine via which port No. a TCP/UDP packet is received by the message conversion apparatus |
| Transceiving interface | Used to determine an interface via which the message conversion apparatus transceives a WSMP packet |
| Protocol | Used to specify an appropriate protocol for the conversion rule |

FIG. 3

MESSAGE CONVERSION APPARATUS, MESSAGE TRANSMISSION SYSTEM, MESSAGE TRANSMISSION METHOD AND COMPUTER PROGRAM PRODUCT THEREOF

PRIORITY

This application claims priority to Taiwan Patent Application No. 100120013 filed on Jun. 8, 2011, which is hereby incorporated by reference in its entirety.

FIELD

The present invention relates to a message conversion apparatus, a message transmission system, a message transmission method and a computer program product thereof. More specifically, the present invention relates to a message conversion apparatus, a message transmission system, a message transmission method and a computer program product thereof capable of converting a packet.

BACKGROUND

With the development and advancement of wireless communication technologies, related applications also increase extensively. Among these wireless communication technologies, those applied to apparatus moving in high speed have attracted much attention. For example, vehicles on-road can retrieve information (e.g., electronic maps, road condition information, parking information and so on) necessary for driving by wireless communication technologies. As examples of other applications, the wireless communication technologies may also be used for communication between vehicles or allow passengers to retrieve network information in real time.

In general network environments, the conventional way in data transmission is through a Transmission Control Protocol/User Datagram Protocol (TCP/UDP) module. In the Open System Interconnection (OSI) Reference Model, TCP/UDP belongs to a communication protocol of the fourth layer (i.e., the transmission layer), and the third layer (i.e., the network layer) adopts the Internet Protocol (IP). Therefore, according to the specifications of the Internet Protocol, two points which are desired to connect directly with each other for communication must be restricted within a same subnet.

If a TCP/UDP transmission module is used for a moving vehicle in a Wireless Access in Vehicular Environment (WAVE)/Dedicated Short Range Communication (DSRC) operating environment, firstly the moving vehicle must know the subnet in which it is located before performing data transmissions. However, as the moving vehicle continuously changes its position, the subnet in which it located also changes continuously, and this may lead to communication interruptions and poor communication quality.

Therefore, in the WAVE/DSRC environment, a commonly used way of communication is through use of the Wave Short Message Protocol (WSMP). The WSMP is characterized in that, data transmissions are carried out in a broadcast manner and are identified through provider service identifiers (PSIDs), and the two points which are desired to connect directly with each other for communication need not to be restricted within the same subnet. Therefore, data transmissions in the WAVE/DSRC environment have greater flexibility and can provide desirable transmission quality. However, WSMP still has a drawback that it cannot provide reliable transmission.

Accordingly, there is a need to provide a message conversion apparatus and a message transmission method capable of converting packets between communication protocols, supporting reliable transmissions and carrying out data transmissions with a TCP/UDP module so that the user needs not to change the design framework of application programs.

SUMMARY

An objective of certain embodiments of the present invention is to provide a message conversion apparatus. The message conversion apparatus comprises a user transceiving unit, a processing unit and a wireless transceiving unit. The user transceiving unit is configured to receive a first transmission control protocol/user datagram protocol (TCP/UDP) packet. The processing unit is electrically connected to the user transceiving unit, and is configured to convert the first TCP/UDP packet into a first dedicated protocol packet corresponding to a dedicated protocol according to a first conversion rule. The wireless transceiving unit is electrically connected to the processing unit and is configured to transmit the first dedicated protocol packet.

Another objective of certain embodiments of the present invention is to provide a message transmission system. The message transmission system comprises a first message conversion apparatus and a second message conversion apparatus. The first message conversion apparatus is configured to receive a first TCP/UDP packet, convert the first TCP/UDP packet into a first dedicated protocol packet corresponding to a dedicated protocol according to a first conversion rule, and transmit the first dedicated protocol packet. The second message conversion apparatus communicates with the first message conversion apparatus, and is configured to receive the first dedicated protocol packet and convert the first dedicated protocol packet into a second TCP/UDP packet according to a second conversion rule.

Yet another objective of certain embodiments of the present invention is to provide a message transmission method for use in the aforesaid message transmission system. The message transmission system comprises a first message conversion apparatus and a second message conversion apparatus, and the second message conversion apparatus communicates with the first message conversion apparatus. The message transmission method comprises the following steps: (a) receiving a first TCP/UDP packet by the first message conversion apparatus; (b) converting the first TCP/UDP packet into a first dedicated protocol packet corresponding to a dedicated protocol by the first message conversion apparatus according to a first conversion rule; (c) transmitting the first dedicated protocol packet by the first message conversion apparatus; (d) receiving the first dedicated protocol packet by the second message conversion apparatus; and (e) converting the first dedicated protocol packet into a second TCP/UDP packet by the second message conversion apparatus according to a second conversion rule.

A further objective of certain embodiments of the present invention is to provide a computer program product, which stores a program for executing a message transmission method for use in a message transmission system. The message transmission system comprises a first message conversion apparatus and a second message conversion apparatus, and the second message conversion apparatus communicates with the first message conversion apparatus. The program comprises: a code A, for enabling the first message conversion apparatus to receive a first TCP/UDP packet; a code B, for enabling the first message conversion apparatus to convert a first TCP/UDP packet into a first dedicated protocol packet corresponding to a dedicated protocol according to a first conversion rule; a code C, for enabling the first message conversion apparatus to transmit the first dedicated protocol packet; a code D, for enabling the second message conversion apparatus to receive the first dedicated protocol packet; and a code E, for enabling the second message conversion apparatus to convert the first dedicated protocol packet into a second TCP/UDP packet according to a second conversion rule.

According to certain embodiments of the present invention, the message conversion apparatus is used to receive a TCP/UDP packet, convert the TCP/UDP packet into a dedicated protocol packet according to a conversion rule and transmit the dedicated protocol packet; and then, another message conversion apparatus receives the dedicated protocol packet and converts it into a TCP/UDP packet according to a conversion rule. Thereby, the present invention can overcome the limitation that two points which desire to perform point-to-point (P2P) transmissions must be restricted within a same subnet when the Internet Protocol is used. Meanwhile, the present invention can advantageously provide desirable transmission quality, reduced transmission delay and a reliable transmission mechanism, and is compatible with a TCP/UDP transmission module.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIG. 3 is a schematic view explaining meanings of individual fields of the conversion rules;

DETAILED DESCRIPTION

In the following description, the present invention will be explained with reference to example embodiments thereof. However, these example embodiments are not intended to limit the present invention to any specific example, embodiment, environment, applications or particular implementations described in these example embodiments. Therefore, description of these example embodiments is only for purpose of illustration rather than to limit the present invention. It should be appreciated that, in the following example embodiments and the attached drawings, elements unrelated to the present invention are omitted from depiction; and dimensional relationships among individual elements in the attached drawings are illustrated only for ease of understanding, but not to limit the actual scale.

Figure 1:
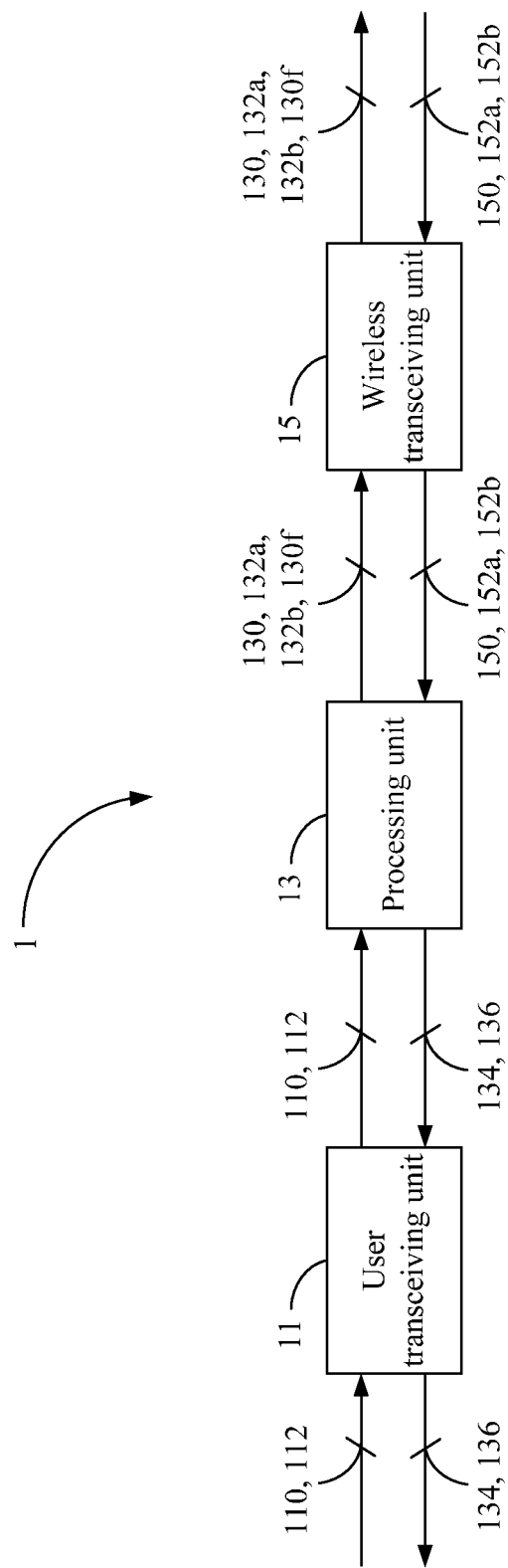
FIG. 1 is a schematic view of a first embodiment of the present invention.

A first embodiment of the present invention is a message conversion apparatus 1, a schematic view of which is depicted in FIG. 1. The message conversion apparatus 1 comprises a user transceiving unit 11, a processing unit 13 and a wireless transceiving unit 15. The processing unit 13 is electrically connected to the user transceiving unit 11 and the wireless transceiving unit 15 respectively. The processing unit 13 may be any of various processors, central processing units (CPUs), microprocessors, calculators or devices with a computing capability and well known to those of ordinary skill in the art, either currently available or to be developed in the future.

The user transceiving unit 11 is a Transmission Control Protocol/User Datagram Protocol (TCP/UDP) module. The user transceiving unit 11 may be electrically connected with at least one user equipment (UE), and is configured to receive a TCP/UDP packet. The TCP/UDP packet described in the present invention may be a TCP packet or a UDP packet depending on a protocol adopted for the packet in practical applications. The user transceiving unit 11 connects with the UE either wirelessly or in a wired way, for example, through an RJ-45 interface or through a Wi-Fi (Wireless Fidelity) wireless transmission interface.

The UE described in the present invention generally refers to a cell phone, a personal digital assistant (PDA), a notebook computer, a tablet computer, a game machine, a digital media player, or any other device with a communication function and well known to those of ordinary skill in the art; and the form of the UE is not intended to limit the scope of the present invention.

The message conversion apparatus 1 of the present invention is configured to convert a TCP/UDP packet into a dedicated protocol packet corresponding to a dedicated protocol, and convert a dedicated protocol packet into a TCP/UDP packet.

It shall be particularly appreciated that, the dedicated protocol described in the present invention generally refers to any communication protocol that can accomplish transmissions across the fourth layer specification and the third layer specification in the Open System Interconnection Reference Model (OSI), and the dedicated protocol transmits a packet according to an identifier. Therefore, the dedicated protocol allows for direct point-to-point transmissions, and this overcomes the limitation that point-to-point transmissions can only be accomplished within a same subnet when the Internet Protocol (IP) is used.

For example, the dedicated protocol is a Wave Short Message Protocol (WSMP) in this embodiment; and correspondingly, the message conversion apparatus 1 is configured to convert a TCP/UDP packet into a WSMP packet and convert a WSMP packet into a TCP/UDP packet. In other embodiments, the dedicated protocol may also be a protocol (which is either currently available or to be developed in the future) capable of transmitting a packet according to an identifier or some other protocol well known to those of ordinary skill in the art, but is not limited to WSMP.

It shall be firstly appreciated that, in the WSMP specification, a Provider Service Identifier (PSID) is used as an identifier; therefore, the PSID will be taken as an example in the following descriptions of embodiments of the present invention. In other embodiments adopting other different dedicated protocols, the identifier may also be some other symbol or numerical value that can be used to identify a packet, and is not limited to a PSID.

Hereinafter, the WSMP will be taken as an example to detail how the message conversion apparatus 1 converts a packet. Firstly, the user transceiving unit 11 receives a first TCP/UDP packet 110 and transmits it to the processing unit 13. Then, the processing unit 13 converts the first TCP/UDP packet 110 into a first WSMP packet 130 according to a first conversion rule, and transmits the first WSMP packet 130 to the wireless transceiving unit 15. Finally, the wireless transceiving unit 15 transmits the first WSMP packet 130 in a broadcast manner.

Generally, a TCP/UDP packet comprises a piece of header information and a piece of data information. The header information records packet transmission related information corresponding to the Internet Protocol such as a source address, a source port, a destination address and a destination port of the TCP/UDP packet; and the data information records data contents to be transmitted by the TCP/UDP packet. In order to transmit the data information in a Wireless Access in Vehicular Environment (WAVE)/Dedicated Short Range Communication (DSRC) environment through WSMP, the processing unit 13 must convert the header information of the TCP/UDP packet into header information of a WSMP packet.

Figure 2A:
FIG. 2A is a schematic view illustrating a first conversion rule of the first embodiment according to the present invention.

Specifically, the processing unit 13 has a first conversion rule 2a. Referring to FIG. 2A, a schematic view of the first conversion rule 2a is depicted therein. The processing unit 13 converts the first TCP/UDP packet 110 into the first WSMP packet 130 according to settings of fields in the first conversion rule 2a. Referring to FIG. 3 together, descriptions of the fields in the first conversion rule 2a are illustrated therein. In this embodiment, the first TCP/UDP packet 110 has a source address "s-ip1", a source port "s-port1", a destination address that is an IP address of the message conversion apparatus 1, and a destination port that is a port No. of the message conversion apparatus 1. The first TCP/UDP packet 110 is received via a receiving port "w-port1" of the user transceiving unit 11, and the protocol adopted is TCP.

The field "source address" in the first conversion rule 2a is used to determine a source IP address from which the processing unit 13 can receive a TCP/UDP packet; i.e., the source IP address from which the TCP/UDP packet received by the processing unit 13 comes must be "s-ip1". The field "source port" is used to determine a source port No. from which the processing unit 13 can receive a TCP/UDP packet; i.e., the source port No. from which the TCP/UDP packet received by the processing unit 13 comes must be "s-port1". The field "destination address" is "0", which means that this field is not used (i.e., the field "destination address" is not considered in the first conversion rule 2a); and similarly, the field "destination port" is "0", which means that this field is not used (i.e., the field "destination port" is not considered in the first conversion rule 2a).

The field "receiving port" is used to determine via which port No. the TCP/UDP packet is received by the user transceiving unit 11; i.e., the TCP/UDP packet received by the user transceiving unit 11 is received via the port No. "w-port1". The field "transceiver interface" is used to determine via which transceiving interface the WSMP packet is transceived by the wireless transceiving unit 15; i.e., the wireless transceiving unit 15 transmits the first WSMP packet 130 via the transceiving interface "wave 0". The field "protocol" is used to specify for which protocol the first conversion rule is suitable.

The field "provider service identifier" is used to determine a service identification code corresponding to a TCP/UDP packet; i.e., the processing unit 13 determines that the first provider service identifier corresponding to the first TCP/UDP packet 110 is "psid1" according to the first conversion rule 2a after receiving the first TCP/UDP packet 110.

After determining that the first provider service identifier corresponding to the first TCP/UDP packet 110 is "psid1" according to the first conversion rule 2a, the processing unit 13 converts the header information of the first TCP/UDP packet 110 into header information of the first WSMP packet 130. Specifically, the header information of a TCP/UDP packet comprises a Media Access Control (MAC) header, an Internet Protocol (IP) header and a Transmission Control Protocol (TCP) header. The processing unit 13 replaces the IP header and the TCP header in the header information of the TCP/UDP packet with a WSMP header to form header information of a WSMP packet. The header information of the WSMP packet obtained through the conversion only comprises the MAC header and the WSMP header, and the WSMP header comprises a PSI. Therefore, "psid1" is comprised in the WSMP header of the first WSMP packet 130 in this embodiment.

After converting the header information of the first TCP/UDP packet 110 into the header information of the first WSMP packet 130, the processing unit 13 appends the data information of the first TCP/UDP packet 110 to the header information of the first WSMP packet 130 to form the first WSMP packet 130 (i.e., the data information of the first WSMP packet 130 is identical to that of the first TCP/UDP packet 110). Upon completion of the packet conversion, the processing unit 13 transmits the first WSMP packet 130 to the wireless transceiving unit 15 so that the wireless transceiving unit 15 transmits the first WSMP packet 130 in a broadcast manner.

It shall be particularly appreciated that, the processing unit 13 converts the first TCP/UDP packet 110 into the first WSMP packet 130 according to the first conversion rule 2a in this embodiment. The first conversion rule 2a determines the provider service identifier mainly according to the field "receiving port" (i.e., determines "psid1" according to "w-port1"). In Brief, the processing unit 13 converts the TCP/UDP packet received from the receiving port "w-port1" into a WSMP packet having a first provider service identifier "psid1". However, in other embodiments, the packet transformation may also be performed by the processing unit 13 according to other fields shown in FIG. 3.

The first conversion rule 2a illustrated in FIG. 2A is only intended to explain how the packet conversion is accomplished; and in other embodiments, the first conversion rule may further comprise other fields, and the present invention is not limited by the field contents and the number of fields of the first conversion rule. On the other hand, the first conversion rule may be stored in a register of the processing unit or in a memory unit (not shown) electrically connected to the processing unit, and where the first conversion rule is stored is not intended to limit the scope of the present invention.

The processing unit determines the size of a UDP packet when receiving the UDP packet. If the size of the UDP packet is larger then the maximum data size that can be transmitted via WSMP, for convenience of transmission and to ensure the transmission quality, the processing unit further divides the UDP packet into plural pieces and then converts those pieces into a plurality of WSMP packets respectively. Then the processing unit transmits the WSMP packets respectively via the wireless transceiving unit.

Specifically, the user transceiving unit 11 is further configured to receive a first UDP packet 112 and transmit the first UDP packet 112 to the processing unit 13. The processing unit 13 is further configured to divide and convert the first UDP packet 112 into a second WSMP packet 132a and a second WSMP packet 132b according to the first conversion rule 2a. The way in which the packet is converted is the same as what described above and, thus, will not be further described herein.

The second WSMP packet 132a and the second WSMP packet 132b have the same header information (i.e., the same provider service identifier). The second WSMP packet 132a carries a portion of data information of the first UDP packet 112, and the second WSMP packet 132b carries the remaining portion of the data information of the first UDP packet 112. The processing unit 13 then transmits the second WSMP packet 132a and the second WSMP packet 132b to the wireless transceiving unit 15. Finally, the wireless transceiving unit 15 transmits the second WSMP packet 132a and the second WSMP packet 132b in a broadcast manner.

Apart from converting a TCP/UDP packet into a WSMP packet as described above, the message conversion apparatus 1 may also convert a WSMP packet into a TCP/UDP packet. Specifically, the wireless transceiving unit 15 may be configured to receive a third WSMP packet 150 and transmit the third WSMP packet 150 to the processing unit 12. Next, the processing unit 13 converts the third WSMP packet 150 into a second TCP/UDP packet 134 according to a second conversion rule, and transmits the second TCP/UDP packet 134 to the user transceiving unit 11. Finally, the user transceiving unit 11 transmits the second TCP/UDP packet 134.

Figure 2B:
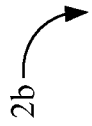
FIG. 2B is a schematic view illustrating a second conversion rule of the first embodiment according to the present invention.

The processing unit 13 further has a second conversion rule 2b. Referring to FIG. 2B, a schematic view of the second conversion rule 2b is depicted therein. The processing unit 13 converts the third WSMP packet 150 into the second TCP/UDP packet 134 according to settings of fields in the second conversion rule 2b. Descriptions of individual fields in the second conversion rule 2b are shown in FIG. 3.

The field "destination address" is used to determine a destination IP address to which the third WSMP packet 150 shall be transmitted; i.e., after the third WSMP packet 150 is converted into the second TCP/UDP packet 134, the processing unit 13 shall transmit the second TCP/UDP packet 134 to the IP address "d-ip3". The field "destination port" is used to determine a destination port No. to which the third WSMP packet 150 shall be transmitted; i.e., after the third WSMP packet 150 is converted into the second TCP/UDP packet 134, the processing unit 13 transmits the second TCP/UDP packet 134 to the port No. "d-port3". Likewise, the fields "source address", "source port" and "receiving port" are all "0", which means that these fields are not used.

The third WSMP packet 150 has a second provider service identifier "psid3", and the wireless transceiving unit 15 receives the third WSMP packet 150 according to the second provider service identifier "psid3". Then, the processing unit 13 converts the header information of the third WSMP packet 150 into header information of the second TCP/UDP packet 134 according to the second conversion rule 2b. In detail, the processing unit 13 converts the WSMP header in the header information of the third WSMP packet 150 into an IP header and a TCP header in the header information of the second TCP/UDP packet 134. The destination address and the destination port information required in the IP header are just the "d-ip3" and the "d-port3" in the second conversion rule 2b respectively.

The processing unit 13 then appends the data information of the third WSMP packet 150 to the header information of the second TCP/UDP packet 134 to form the second TCP/UDP packet 134; i.e., the data information of the second TCP/UDP packet 134 is identical to that of the third WSMP packet 150. Upon completion of the packet conversion, the processing unit 13 transmits the second TCP/UDP packet 134 to the user transceiving unit 11 and the user transceiving unit 11 transmits the second TCP/UDP packet 134 according to the header information of the second TCP/UDP packet 134.

The second conversion rule 2b depicted in FIG. 2B is only intended to illustrate how packet conversion is accomplished in the present invention; and in other embodiments, the second conversion rule may further comprise other fields, and the present invention is not limited by the field contents and the number of fields of the second conversion rule. On the other hand, the second conversion rule may be stored in a register of the processing unit or in a memory unit (not shown) electrically connected to the processing unit, and where the second conversion rule is stored is not intended to limit the scope of the present invention.

The TCP is a kind of reliable transmission protocol. That is, during transmission of a TCP packet, the destination terminal which has received the packet successfully transmits a confirmation signal to the transmitting terminal to confirm completion of the data transmission; and only after receiving the confirmation signal can the transmitting terminal continue to transmit the next packet. Therefore, the message conversion apparatus 1 of the present invention can further provide a reliable transmission mechanism when the packet to be converted and transmitted is a TCP packet.

Specifically, after receiving the third WSMP packet 150, the processing unit 13 can learn from the field "protocol" in the second conversion rule 2b that the second conversion rule 2b adopts the TCP protocol. Then, the processing unit 13 transmits a confirmation packet 130f via the wireless transceiving unit 15. The confirmation packet 130f has the same second provider service identifier "psid3" as the third WSMP packet 150, and the data information of the confirmation packet 130f is used to confirm that the third WSMP packet 150 has been received successfully. Accordingly, the message conversion apparatus 1 of the present invention can still provide a reliable transmission mechanism when transmitting and receiving a WSMP packet.

As described above, the message conversion apparatus 1 can divide a UDP packet into a plurality of WSMP packets and transmits the WSMP packets respectively. On the other hand, the message conversion apparatus 1 may also receive a plurality of WSMP packets, and recombine and convert the WSMP packets into a UDP packet.

More specifically, the wireless transceiving unit 15 may receive a plurality of fourth WSMP packets which, in this embodiment, are a fourth WSMP packet 152a and a fourth WSMP packet 152b, and transmit the fourth WSMP packet 152a and the fourth WSMP packet 152b to the processing unit 13. The processing unit 13 is further configured to convert and recombine the fourth WSMP packet 152a and the fourth WSMP packet 152b into a second UDP packet 136 according to the second conversion rule 2b. The way in which the packets are converted is just the same as what described above and, thus, will not be further described herein. Here, the processing unit 13 combines the data information of the fourth WSMP packet 152a and that of the fourth WSMP packet 152b into data information of the second UDP packet 136. Then, the processing unit 13 transmits the second UDP packet 136 to the user transceiving unit 11. Finally, the user transceiving unit 11 transmits the second UDP packet 136 according to the header information of the second UDP packet 136.

It shall be particularly appreciated that, the message conversion apparatus 1 of the present invention may be disposed in an On Board Unit (OBU) to provide communications between vehicles, or disposed in an Road Side Unit (RSU) to provide communications between vehicles and the RSU. Additionally, the message conversion apparatus 1 may be further disposed in any movable facilities or transportation means (e.g., ships, subways, MRTs or trains) to allow for wireless communications of various mobile apparatuses. Therefore, the site where the message conversion apparatus 1 is disposed is not intended to limit the scope of the present invention.

Figure 4:
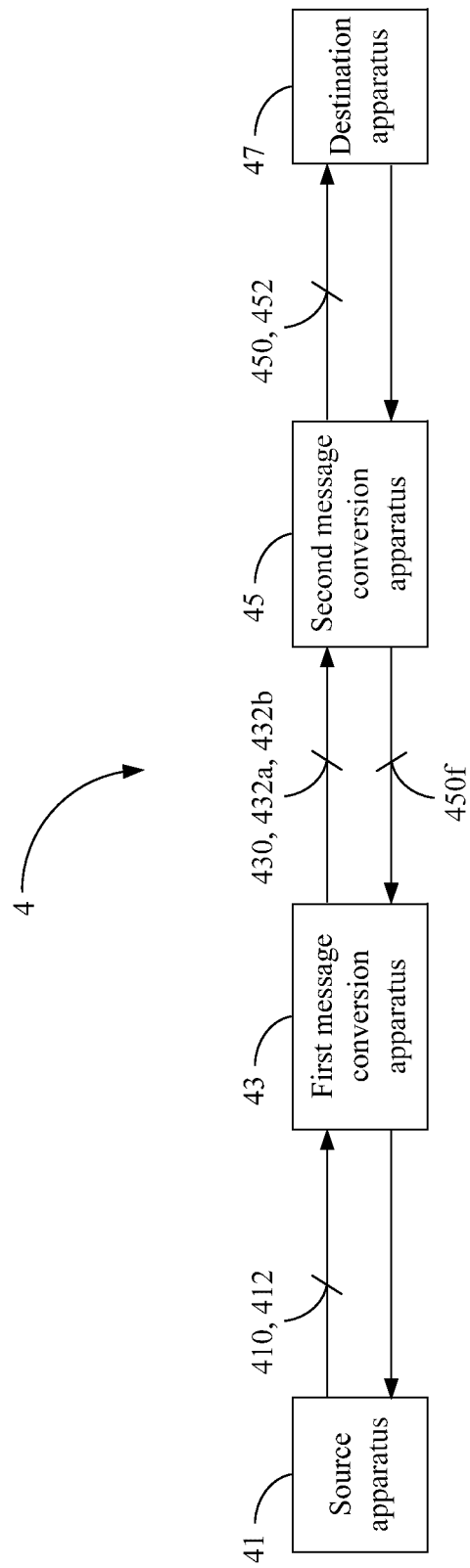
FIG. 4 is a schematic view of a second embodiment of the present invention.

A second embodiment of the present invention is a message transmission system 4, a schematic view of which is depicted in FIG. 4. The message transmission system 4 comprises a source apparatus 41, a first message conversion apparatus 43, a second message conversion apparatus 45 and a destination apparatus 47. The source apparatus 41 is electrically connected to the first message conversion apparatus 43; the first message conversion apparatus 43 is electrically connected to the second message conversion apparatus 45; and the second message conversion apparatus 45 is electrically connected to the destination apparatus 47.

Each of the first message conversion apparatus 43 and the second message conversion apparatus 45 is a message conversion apparatus described in the first embodiment, and can execute all the operations and functions of the message conversion apparatus 1 set forth in the first embodiment. How the first message conversion apparatus 43 and the second message conversion apparatus 45 execute the same operations and functions as the message conversion apparatus 1 will be readily appreciated by those of ordinary skill in the art based on the explanation of the first embodiment, and thus will not be further described herein.

Each of the source apparatus 41 and the destination apparatus 47 is a UE described in the first embodiment, which generally refers to a cell phone, a personal digital assistant (PDA), a notebook computer, a tablet computer, a game machine, a digital media player, or any other device with a communication function and well known to those of ordinary skill in the art. The forms of the source apparatus 41 and the destination apparatus 47 are not intended to limit the scope of the present invention. The connection between the source apparatus 41 and the first message conversion apparatus 43 and the connection between the destination apparatus 47 and the second message conversion apparatus 45 may be implemented wirelessly or in a wired way, for example, through an RJ-45 interface or through a Wi-Fi wireless transmission interface.

The message transmission system 4 of the present invention can convert a packet as described in the first embodiment, and transmit the converted packet. Hereinafter, how the message transmission system 4 of the present invention transmits a message will be detailed. Firstly, the source apparatus 41 transmits a first TCP/UDP packet 410 to the first message conversion apparatus 43. The first message conversion apparatus 43 receives the first TCP/UDP packet 410, converts the first TCP/UDP packet 410 into a first WSMP packet 430 according to a first conversion rule, and transmits the first WSMP packet 430 in a broadcast manner. Then, the second message conversion apparatus 45 receives the first WSMP packet 430, converts the first WSMP packet 430 into a second TCP/UDP packet 450 according to a second conversion rule, and transmits the second TCP/UDP packet 450 to the destination apparatus 47. Finally, the second TCP/UDP packet 450 is received by the destination apparatus 47.

Figure 5A:
FIG. 5A is a schematic view illustrating a first conversion rule of a second embodiment according to the present invention.

Hereinafter, an example will be described. The first message conversion apparatus 43 has a first conversion rule 5*a*. Referring to FIG. 5A, a schematic view of the first conversion rule 5*a* is illustrated therein. The first message conversion apparatus 43 converts the first TCP/UDP packet 410 into the first WSMP packet 430 according to settings of fields in the first conversion rule 5*a*. Descriptions of the fields of the first conversion rules 5*a* are shown in FIG. 3, and will not be further described herein.

In this embodiment, the first TCP/UDP packet 410 has a source address "192.168.1.1" (i.e., an IP address of the source apparatus 41), a source port "1239" (i.e., a port No. used by the source apparatus 41 to transmit the first TCP/UDP packet 410), a destination address "192.168.1.2" (i.e., an IP address of the first message conversion apparatus 43) and a destination port "5555" (i.e., a port No. used by the first message conversion apparatus 43 to receive the first TCP/UDP packet 410).

The first message conversion apparatus 43 receives and converts the first TCP/UDP packet 410 into the first WSMP packet 430 according to the first conversion rule 5*a*. Specifically, the first message conversion apparatus 43 converts the first TCP/UDP packet 410 corresponding to the source address "192.168.1.1", the source port "1239" and the receiving port "5555" into the first WSMP packet 430 according to the first conversion rule 5*a*. The first conversion rule 5*a* determines that a first provider service identifier is "208" mainly according to the receiving port "5555".

After determining that the first provider service identifier is "208" according to the first conversion rule 5*a*, the first message conversion apparatus 43 converts the header information of the first TCP/UDP packet 410 into header information of the first WSMP packet 430 and appends the data information of the first TCP/UDP packet 410 to header information of the first WSMP packet 430 to form the first WSMP packet 430. The conversion is accomplished in the same way as described in the first embodiment and, thus, will not be further described herein. Next, the first message conversion apparatus 43 transmits the first WSMP packet 430 in a broadcast manner.

Next, the second message conversion apparatus 45 receives the first WSMP packet 430 according to the first provider service identifier, converts the first WSMP packet 430 into the second TCP/UDP packet 450 according to a second conversion rule, and transmits the second TCP/UDP packet 450 to the destination apparatus 47. Finally, the destination apparatus 47 receives the second TCP/UDP packet 450.

Figure 5B:
FIG. 5B is a schematic view illustrating a second conversion rule of the second embodiment according to the present invention.

The second message conversion apparatus 45 has a second conversion rule 5*b*. Referring to FIG. 5B, a schematic view of the second conversion rule 5*b* is illustrated therein. The second message conversion apparatus 45 converts the first WSMP packet 430 into the second TCP/UDP packet 450 according to settings of fields in the second conversion rule 5*b*. Descriptions of the fields in the second conversion rule 5*b* are shown in FIG. 3, and will not be described again herein.

The first WSMP packet 430 has a second provider service identifier "208", and the second message conversion apparatus 45 receives the first WSMP packet 430 according to the second provider service identifier "208". Then, the second message conversion apparatus 45 converts the header information of the first WSMP packet 430 into header information of the second TCP/UDP packet 450 according to the second conversion rule 5*b*. The conversion is carried out in the same way as described in the first embodiment and, thus, will not be further described herein.

The destination address and the destination port information required in the IP header of the second TCP/UDP packet 450 are just "192.168.3.1" and "1235" in the second conversion rule 5*b*. Upon completion of the packet conversion, the second message conversion apparatus 45 transmits the second TCP/UDP packet 450 according to the header information of the second TCP/UDP packet 450. Here, "192.168.3.1" is just the IP address of the destination apparatus 47, and "1235" is just the port No. via which the second TCP/UDP packet 450 is received by the destination apparatus 47.

The first conversion rule 5*a* depicted in FIG. 5A and the second conversion rule 5*b* depicted in FIG. 2B are only intended to illustrate how packet conversion is accomplished in the present invention; and in other embodiments, the first conversion rule and the second conversion rule may further comprise other fields, and the present invention is not limited by the field contents and the numbers of fields of the first conversion rule and the second conversion rule.

The TCP is a kind of reliable transmission protocol. That is, during transmission of a TCP packet, the destination terminal which has received the packet successfully transmits a confirmation signal to the transmitting terminal to confirm completion of the data transmission; and only after receiving the confirmation signal can the transmitting terminal continue to transmit a next packet. Therefore, the message transmission apparatus 4 of the present invention can further provide a reliable transmission mechanism when the packet to be converted and transmitted is a TCP packet.

Specifically, after receiving the first WSMP packet 430, the second message conversion apparatus 45 can learn from the field "protocol" in the second conversion rule 5*b* that the second conversion rule 5*b* adopts the TCP protocol. Then, the second message conversion apparatus 45 transmits a confirmation packet 450*f*. The confirmation packet 450*f* has the same first provider service identifier "208" as the first WSMP packet 430, and the data information of the confirmation packet 450*f* is used to confirm that the first WSMP packet 430 has been received successfully. Accordingly, the message transmission apparatus 4 of the present invention can still provide a reliable transmission mechanism when transmitting and receiving a WSMP packet.

If the UDP packet received by the first message conversion apparatus 43 is larger then the maximum data size that can be transmitted via WSMP, for convenience of transmission and to ensure the transmission quality, the first message conversion apparatus 43 further divides the UDP packet into plural pieces and then converts those pieces into a plurality of WSMP packets respectively. Then, the processing unit transmits the WSMP packets respectively.

Specifically, the source apparatus 41 further transmits a first UDP packet 412 to the first message conversion apparatus 43; and correspondingly, the first message conversion apparatus 43 further receives the first UDP packet 412, and divides and converts the first UDP packet 412 into a second WSMP packet 432*a* and a second WSMP packet 432*b* according to the first conversion rule 5*a*. The packet conversion is accomplished in the same way as what described above and, thus, will not be further described herein. The first message conversion apparatus 43 then transmits the second WSMP packet 432*a* and the second WSMP packet 432*b* in a broadcast manner.

Next, the second message conversion apparatus 45 further receives the second WSMP packet 432*a* and the second WSMP packet 432*b*, and converts and recombines the second WSMP packet 432*a* and the second WSMP packet 432*b* into a second UDP packet 452 according to the second conversion rule 5*b*. The packet conversion is accomplished in the same way as what described above and, thus, will not be further described herein. Here, data information of the second WSMP packet 432*a* and data information of the second WSMP packet 432*b* are combined into data information of the second UDP packet 452 by the second message conversion apparatus 45. Finally, the second message conversion apparatus 45 transmits the second UDP packet 452 to the destination apparatus 47 according to the header information of the second UDP packet 452.

In addition to what described above, the second embodiment can also execute all the operations and functions set forth in the first embodiment. How the second embodiment executes these operations and functions will be readily appreciated by those of ordinary skill in the art based on the explanation of the first embodiment, and thus will not be further described herein.

A third embodiment of the present invention is a message transmission method for use in the message transmission system of the second embodiment. The message transmission system comprises a source apparatus, a first message conversion apparatus, a second message conversion apparatus and a destination apparatus. The source apparatus is electrically connected to the first message conversion apparatus; the first message conversion apparatus is electrically connected to the second message conversion apparatus; and the second message conversion apparatus is electrically connected to the destination apparatus.

The message transmission method described in the third embodiment may be implemented by a computer program product. When the computer program product is loaded into the message transmission system and a plurality of codes comprised therein is executed, the message transmission method described in the third embodiment can be accomplished. The computer program product may be stored in a tangible machine-readable medium, such as a read only memory (ROM), a flash memory, a floppy disk, a hard disk, a compact disk (CD), a mobile disk, a magnetic tape, a database accessible to networks, or any other storage media with the same function and well known to those skilled in the art.

Figure 6:
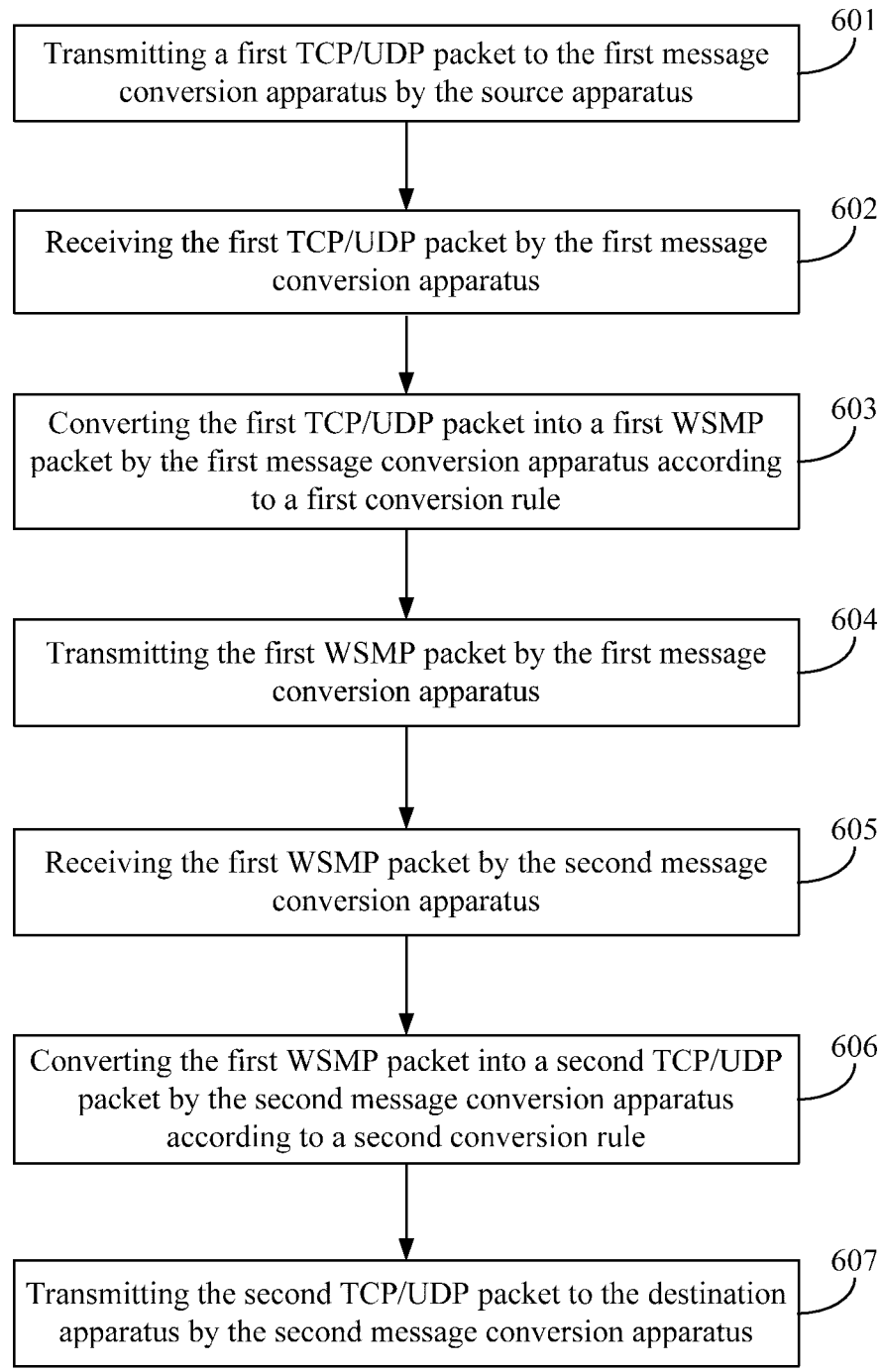
FIG. 6 is a flowchart diagram of a third embodiment of the present invention.

FIG. 6 depicts a flowchart diagram of the message transmission method according to the third embodiment. Firstly in step 601, a first TCP/UDP packet is transmitted by the source apparatus to the first message conversion apparatus. Then in step 602, the first TCP/UDP packet is received by the first message conversion apparatus, and in step 603, the first TCP/UDP packet is converted into a first WSMP packet by the first message conversion apparatus according to a first conversion rule. In step 604, the first WSMP packet is transmitted by the first message conversion apparatus.

The message transmission method then proceeds to step 605 where the first WSMP packet is received by the second message conversion apparatus. Then in step 606, the first WSMP packet is converted into a second TCP/UDP packet by the second message conversion apparatus according to a second conversion rule. Finally in step 607, the second TCP/UDP packet is transmitted to the destination apparatus by the second message conversion apparatus.

The first WSMP packet has a first provider service identifier. Correspondingly, the step 602 may be a step of receiving the first TCP/UDP packet by the first message conversion apparatus via a receiving port; the step 603 may be a step of determining the first provider service identifier by the first message conversion apparatus according to the receiving port so as to convert the first TCP/UDP packet into the first WSMP packet; and the step 605 may be a step of receiving the first WSMP packet by the second message conversion apparatus according to the first provider service identifier.

When the packet to be converted and transmitted is a TCP packet, the message transmission method may further comprise a step of transmitting a confirmation packet to the first message conversion apparatus by the second message conversion apparatus after receiving the first WSMP packet so as to provide a reliable transmission mechanism.

Figure 7:
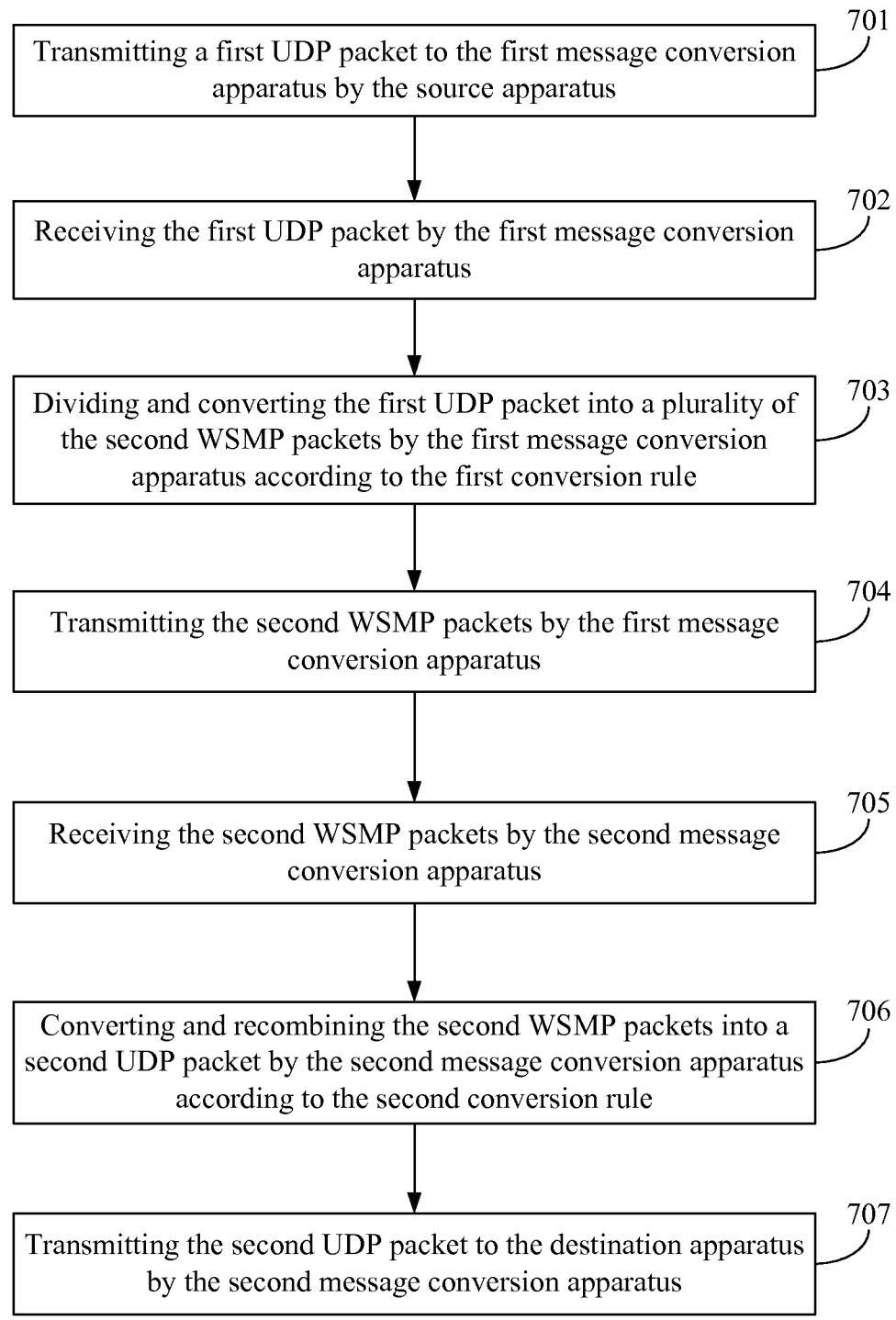
FIG. 7 is another flowchart diagram of the third embodiment of the present invention.

When the size of the UDP packet is larger than the maximum data size that can be transmitted via WSMP, the message transmission method may further execute steps shown in the flowchart diagram of FIG. 7 for convenience of transmission and to ensure the transmission quality. Firstly in step 701, a first UDP packet is transmitted by the source apparatus to the first message conversion apparatus. Then in step 702, the first UDP packet is received by the first message conversion apparatus, and in step 703, the first UDP packet is divided and converted into a plurality of second WSMP packets by the first message conversion apparatus according to the first conversion rule. In step 704, the second WSMP packets are transmitted by the first message conversion apparatus.

Then, the message transmission method proceeds to step 705 where the second WSMP packets are received by the second message conversion apparatus. Then in step 706, the second WSMP packets are converted and recombined into a second UDP packet by the second message conversion apparatus according to the second conversion rule. Finally in step 707, the second UDP packet is transmitted by the second message conversion apparatus to the destination apparatus.

In addition to the aforesaid steps, the third embodiment can also execute all the operations and functions set forth in the first embodiment. How the third embodiment executes these operations and functions will be readily appreciated by those of ordinary skill in the art based on the explanation of the first embodiment, and thus will not be further described herein.

According to the above descriptions of the present invention, a message conversion apparatus is disposed in a mobile apparatus to receive a TCP/UDP packet transmitted by a source apparatus and convert the TCP/UDP packet into a dedicated protocol packet for use in wireless data transmissions; and then, another message conversion apparatus converts the received dedicated protocol packet into a TCP/UDP packet and transmits the TCP/UDP packet to a destination apparatus. Thereby, the present invention can overcome the limitation that two points which perform point-to-point (P2P) transmissions must be restricted in a same subnet when the Internet Protocol is used. Meanwhile, the present invention can advantageously provide desirable transmission quality, reduced transmission delay and a reliable transmission mechanism, and is compatible with a TCP/UDP transmission module.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A message conversion apparatus, comprising:
    a user transceiving unit, being configured to receive a first transmission control protocol/user datagram protocol (TCP/UDP) packet;
    a processing unit, being electrically connected to the user transceiving unit and, configured to convert the first TCP/UDP packet into a first dedicated protocol packet corresponding to a dedicated protocol according to a first conversion rule; and
    a wireless transceiving unit, being electrically connected to the processing unit and, configured to transmit the first dedicated protocol packet;
    wherein the user transceiving unit receives the first TCP/UDP packet via a receiving port, the first dedicated protocol packet has a first identifier, and the first conversion rule determines the first identifier according to the receiving port,
    wherein wherein the wireless transceiving unit is further configured to receive a third dedicated protocol packet, the processing unit is further configured to convert the third dedicated protocol packet into a second TCP/UDP packet according to a second conversion rule, and the user transceivinq unit is further configured to transmit the second TCP/UDP protocol packet,
    wherein the third dedicated protocol packet has a second identifier, and the wireless transceivinq unit receives the third dedicated protocol packet according to the second identifier, and
    wherein the dedicated protocol is a wave short message protocol (WSMP), the first identifier is a first provider service identifier (PSID), and the second identifier is a second PSID.

2. The message conversion apparatus as claimed in claim 1, wherein the user transceiving unit is further configured to receive a first UDP packet, the processing unit further divides and converts the first UDP packet into a plurality of second dedicated protocol packets according to the first conversion rule, and the wireless transceiving unit is further configured to transmit the second dedicated packets.

3. The message conversion apparatus as claimed in claim 1, wherein the wireless transceiving unit is further configured to transmit a confirmation packet after receiving the third dedicated protocol packet.

4. The message conversion apparatus as claimed in claim 1, wherein the wireless transceiving unit is further configured to receive a plurality of fourth dedicated packets, and the processing unit is further configured to convert and recombine the fourth dedicated protocol packets into a second UDP packet according to the second conversion rule.

5. A message transmission system, comprising:
    a first message conversion device, being configured to receive a first TCP/UDP packet, convert the first TCP/UDP packet into a first dedicated protocol packet corresponding to a dedicated protocol according to a first conversion rule, and transmit the first dedicated protocol packet; and
    a second message conversion device, communicating with the first message conversion device, being configured to receive the first dedicated protocol packet, and convert the first dedicated protocol packet into a second TCP/UDP packet according to a second conversion rule,
    wherein the first message conversion device receives the first TCP/UDP packet via a receiving port, the first dedicated protocol packet has an identifier, the first conversion rule determines the identifier according to the receiving port, and the second message conversion device receives the first dedicated protocol packet according to the identifier, and
    wherein the dedicated protocol is a WSMP, and the identifier is a PSID.

6. The message transmission system as claimed in claim 5, wherein the first message conversion device is further configured to receive a first UDP packet, and divide and convert the first UDP packet into a plurality of second dedicated protocol packets according to the first conversion rule, and transmit the second dedicated protocol packets, and the second message conversion device is further configured to receive the second dedicated protocol packets, and convert and recombine the second dedicated protocol packets into a second UDP packet according to the second conversion rule.

7. The message transmission system as claimed in claim 5, wherein the second message conversion device is further configured to transmit a confirmation packet after receiving the first dedicated protocol packet.

8. The message transmission system as claimed in claim 5, further comprising a source device and a destination device, wherein the source apparatus is electrically connected to the first message conversion device and configured to transmit the first TCP/UDP packet to the first message conversion device, the destination device is electrically connected to the second message conversion device, and the second message conversion device is configured to transmit the second TCP/UDP packet to the destination device.

9. A message transmission method for use in a message transmission system, the message transmission system comprising a first message conversion apparatus and a second message conversion apparatus, and the second message conversion apparatus communicating with the first message conversion apparatus, the message transmission method comprising the following steps:
(a) receiving a first TCP/UDP packet by the first message conversion apparatus;
(b) converting the first TCP/UDP packet into a first dedicated protocol packet corresponding to a dedicated protocol by the first message conversion apparatus according to a first conversion rule;
(c) transmitting the first dedicated protocol packet by the first message conversion apparatus;
(d) receiving the first dedicated protocol packet by the second message conversion apparatus; and
(e) converting the first dedicated protocol packet into a second TCP/UDP packet by the second message conversion apparatus according to a second conversion rule,
wherein the first dedicated protocol packet has an identifier, the step (a) is a step of receiving the first TCP/UDP packet by the first message conversion apparatus via a receiving port, the step (b) is a step of determining the identifier by the first message conversion apparatus according to the receiving port so as to convert the first TCP/UDP packet into the first dedicated protocol packet, and the step (d) is a step of receiving the first dedicated packet by the second message conversion apparatus according to the identifier, and
wherein the dedicated protocol is a WSMP, and the identifier is a PSID.

10. The message transmission method as claimed in claim 9, further comprising the following steps:
(f) receiving a first UDP packet by the first message conversion apparatus;
(g) dividing and converting the first UDP packet into a plurality of the second dedicated protocol packets by the first message conversion apparatus according to the first conversion rule;
(h) transmitting the second dedicated protocol packets by the first message conversion apparatus;
(i) receiving the second dedicated protocol packets by the second message conversion apparatus; and
(j) converting and recombining the second dedicated protocol packets into a second UDP packet by the second message conversion apparatus according to the second conversion rule.

11. The message transmission method as claimed in claim 9, further comprising the following step:
(k) transmitting a confirmation packet by the second message conversion apparatus after receiving the first dedicated protocol packet.

12. The message transmission method as claimed in claim 9, wherein the message transmission system further comprises a source apparatus and a destination apparatus, the source apparatus is electrically connected to the first message conversion apparatus, the destination apparatus is electrically connected to the second message conversion apparatus, and the message transmission method further comprises the following steps:
(l) transmitting the first TCP/UDP packet to the first message conversion apparatus by the source apparatus; and
(m) transmitting the second TCP/UDP packet to the destination apparatus by the second message conversion apparatus.

13. A computer program product, storing a program on a non-transitory computer-readable storage medium for executing a message transmission method for use in a message transmission system, the message transmission system comprising a first message conversion apparatus and a second message conversion apparatus, the second message conversion apparatus communicating with the first message conversion apparatus, the program comprising:
a code A, for enabling the first message conversion apparatus to receive a first TCP/UDP packet;
a code B, for enabling the first message conversion apparatus to convert a first TCP/UDP packet into a first dedicated protocol packet corresponding to a dedicated protocol according to a first conversion rule;
a code C, for enabling the first message conversion apparatus to transmit the first dedicated protocol packet;
a code D, for enabling the second message conversion apparatus to receive the first dedicated protocol packet; and
a code E, for enabling the second message conversion apparatus to convert the first dedicated protocol packet into a second TCP/UDP packet according to a second conversion rule,
wherein the first dedicated protocol has an identifier, the code A is a code for enabling the first message conversion apparatus to receive the first TCP/UDP packet via a receiving port, the code B is a code for enabling the first message conversion apparatus to determine the identifier according to the receiving port so as to convert the first TCP/UDP packet into the first dedicated protocol packet, and the code D is a code for enabling the second message conversion apparatus to receive the first dedicated protocol packet according to the identifier, and
wherein the dedicated protocol is a WSMP, and the identifier is a PSID.

14. The computer program product as claimed in claim 13, wherein the program further comprises:
a code F, for enabling the first message conversion apparatus to receive a first UDP packet;
a code G, for enabling the first message conversion apparatus to divide and convert the first UDP packet into a plurality of second dedicated protocol packets according to the first conversion rule;
a code H, for enabling the first message conversion apparatus to transmit the second dedicated protocol packets;
a code I, for enabling the second message conversion apparatus to receive the second dedicated protocol packets; and
a code J, for enabling the second message conversion apparatus to convert and recombine the second dedicated protocol packets into a second UDP packet according to the second conversion rule.

15. The computer program product as claimed in claim 13, wherein the program further comprises:

a code K, for enabling the second message conversion apparatus to transmit a confirmation packet after receiving the first dedicated protocol packet.

16. The computer program product as claimed in claim 13, wherein the message transmission system further comprises a source apparatus and a destination apparatus, the source apparatus is electrically connected to the first message conversion apparatus, the destination apparatus is electrically connected to the second message conversion apparatus, the program further comprises:

a code L, for enabling the source apparatus to transmit the first TCP/UDP packet to the first message conversion apparatus; and a code M, for enabling the second message conversion apparatus to transmit the second TCP/UDP packet to the destination apparatus.

\* \* \* \* \*